June 28, 1955 I. GHERTMAN 2,711,794

TAPE CONTROLLED COLUMN BY COLUMN CARD PUNCH

Filed March 11, 1952 8 Sheets-Sheet 1

INVENTOR
IOINO GHERTMAN
BY Robert S. Dunham
ATTORNEY

INVENTOR
IOINO GHERTMAN
BY Robert S. Dunlam
ATTORNEY

June 28, 1955 I. GHERTMAN 2,711,794

TAPE CONTROLLED COLUMN BY COLUMN CARD PUNCH

Filed March 11, 1952 8 Sheets-Sheet 3

INVENTOR
IOINO GHERTMAN
BY Robert S. Dunham
ATTORNEY

TAPE CONTROLLED COLUMN BY COLUMN CARD PUNCH

Filed March 11, 1952

8 Sheets-Sheet 4

INVENTOR
IOINO GHERTMAN
BY Robert S. Dunham
ATTORNEY

TAPE CONTROLLED COLUMN BY COLUMN CARD PUNCH

Filed March 11, 1952 8 Sheets-Sheet 5

INVENTOR
IOINO GHERTMAN
BY Robert S. Dunham
ATTORNEY

TAPE CONTROLLED COLUMN BY COLUMN CARD PUNCH

Filed March 11, 1952 8 Sheets-Sheet 6

INVENTOR
IOINO GHERTMAN
BY *Robert S. Dunham*
ATTORNEY

TAPE CONTROLLED COLUMN BY COLUMN CARD PUNCH

Filed March 11, 1952 8 Sheets-Sheet 7

INVENTOR
IOINO GHERTMAN
BY Robert S. Dunlam
ATTORNEY

TAPE CONTROLLED COLUMN BY COLUMN CARD PUNCH

Filed March 11, 1952 8 Sheets-Sheet 8

INVENTOR
IOINO GHERTMAN
BY Robert S. Dunham
ATTORNEY

United States Patent Office 2,711,794

Patented June 28, 1955

2,711,794

TAPE CONTROLLED COLUMN BY COLUMN CARD PUNCH

Ioino Ghertman, St. Mande, France, assignor to International Business Machines Corporation, New York, N. Y., a corporation of New York Application March 11, 1952, Serial No. 275,925

Claims priority, application France March 15, 1951

8 Claims. (Cl. 164—115)

This invention relates to a tape controlled record card punching machine. More particularly, the invention relates to a high speed tape controlled record card punch designed to punch rectangular cards in column by column order as such cards intermittently move under the card punches in the direction of their longer axis in column-by-column steps.

In previous tape controlled column by column record card punching machines, the record cards to be punched are carried through a punching station by means of a feed mechanism equipped with a rack which advances such cards lengthwise in column by column order. A machine of this kind is shown in United States Patent No. 2,340,801, granted to Charles R. Doty and Edward J. Rabenda, February 1, 1944.

When a record card is punched in a device like that shown in the Doty et al. patent, another unit causes the card to be ejected into a stacker, and the card carrier is restored to a start position to receive the following card. During this operation the control tape remains at rest, and this results in a certain delay during the registration of the tape data and card columns whenever a card is fed under the punching station.

Certain card reproducing machines have been known heretofore which are not subject to the objection noted concerning the previously mentioned tape controlled punch mechanism. A reproducing punch of the latter class is that in United States Patent No. 2,032,805, granted to Clair D. Lake, March 3, 1936, reissued as Reissue No. 21,133 on June 27, 1939. The reproducing punch of the Lake patent is, however, not adapted for control by means of a control tape adapted for column-by-column sensing inasmuch as the cards processed in that reproducing punch are fed under a line of punches in digit-by-digit order, so that all perforations of equal value are punched simultaneously. Thus, when line 8 of a card reaches the row of punches, all the columns where this digit is to be recorded are punched simultaneously. Similarly, when the last line of the card runs under the punches, a perforation representative of the digit 9 is punched in all the columns where such digit is to be recorded. In order to operate a punch of this kind under control of column-by-column tape records it has heretofore been necessary to store the data read from the tape and read such data out of storage in digit-by-digit order for control of the punching operation.

In the aforesaid Lake patent the record cards are fed under the reproducing punches in step-by-step progression, one index point at a time by means of a Geneva drive arrangement which produces the intermittent feed motion. This invention retains the intermittent Geneva feed of the Lake patent, but modifies the drive to the extent necessary to obtain column-by-column feed, i. e. feed of the cards the distance of one column at a time.

Since control tapes have values recorded thereon in column-by-column order, it has not been possible heretofore to control a record card punch such as that shown in the Lake patent by means of such control tapes.

It is the main object of the present invention, therefore, to provide a record card perforating machine generally similar to that shown in the Lake patent which is adapted to operate under the influence of control tapes. To this end the perforating machine of the Lake patent has been somewhat modified and additional instrumentalities for reading control tapes have been added.

It is a further object of the invention to provide a record card perforating machine of the class described to operate on cards from either one or two decks of such cards in column by column order, so that two cards may be punched simultaneously.

It is a further object of the present invention to provide a pair of tape feeding devices governed by the card feeding mechanism so that both card and tape feeds are kept in synchronism, and so that correspondence be maintained between the columns of the cards to be punched and the columns of the tape running through the tape reading station.

It is another object of the invention to provide means controlled by impulses produced by special tape signals or special card signals to control the card punching operation.

It is another object of the present invention to provide checking means to control the correspondence between the data read from a tape and that punched into the cards, together with means for energizing a signal lamp and marking the tape column which was erroneously reproduced.

Other objects and features of the invention will become apparent in the following description when read in reference to the attached drawings showing by way of example one embodiment of the present invention.

Figure 11:
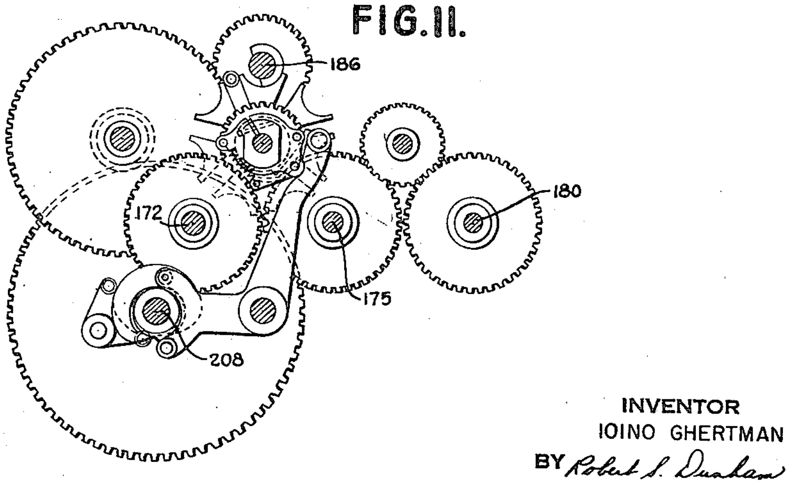
Figures 5, 6, 7:
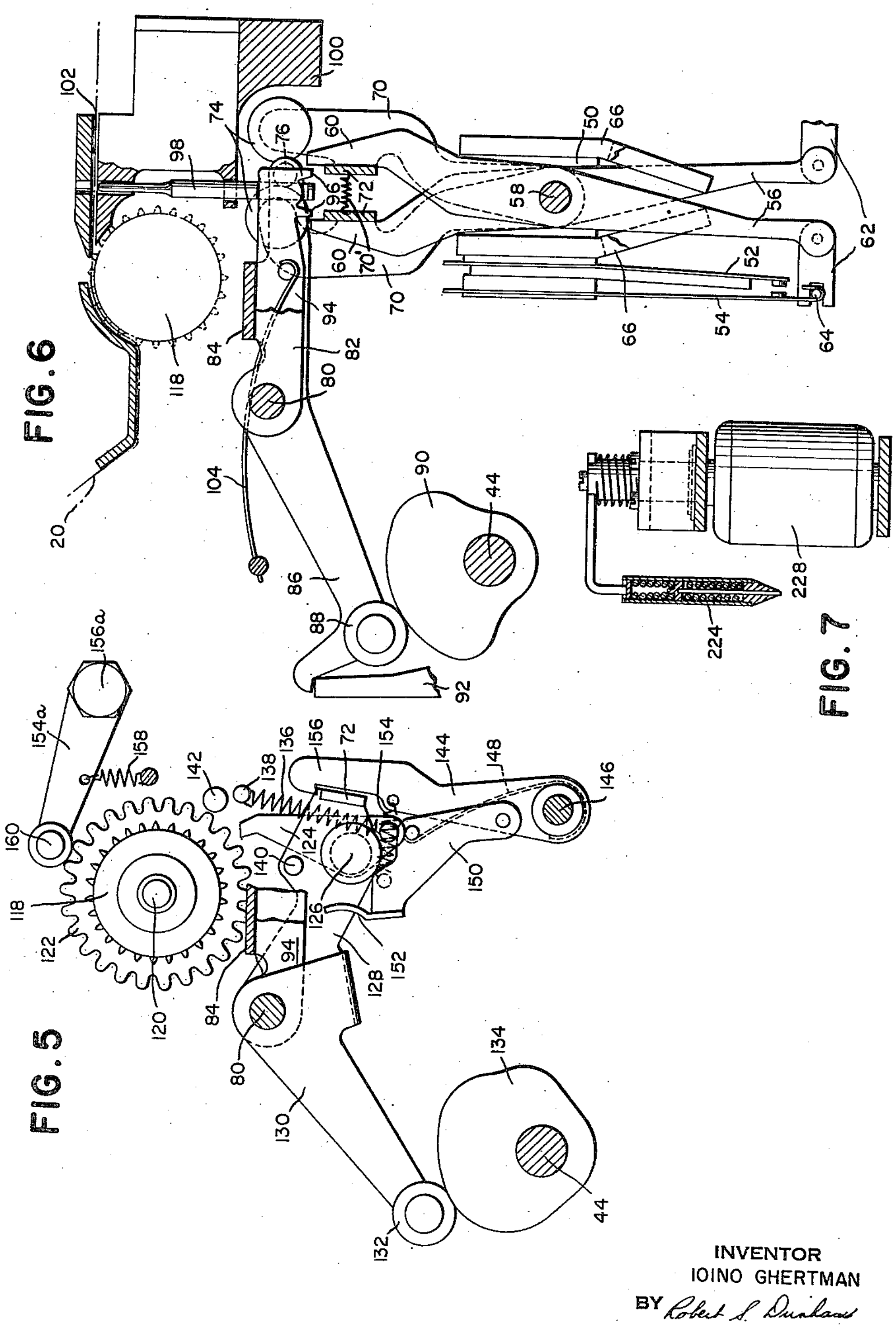
Fig. 5 shows the details of the tap feeding mechanism associated with each reading head.
Fig. 6 is a sectional view through the tape sensing pin control mechanism of each reading head.
Fig. 7 is an electromagnetically controlled stylus forming part of each reading station.
Figure 8:
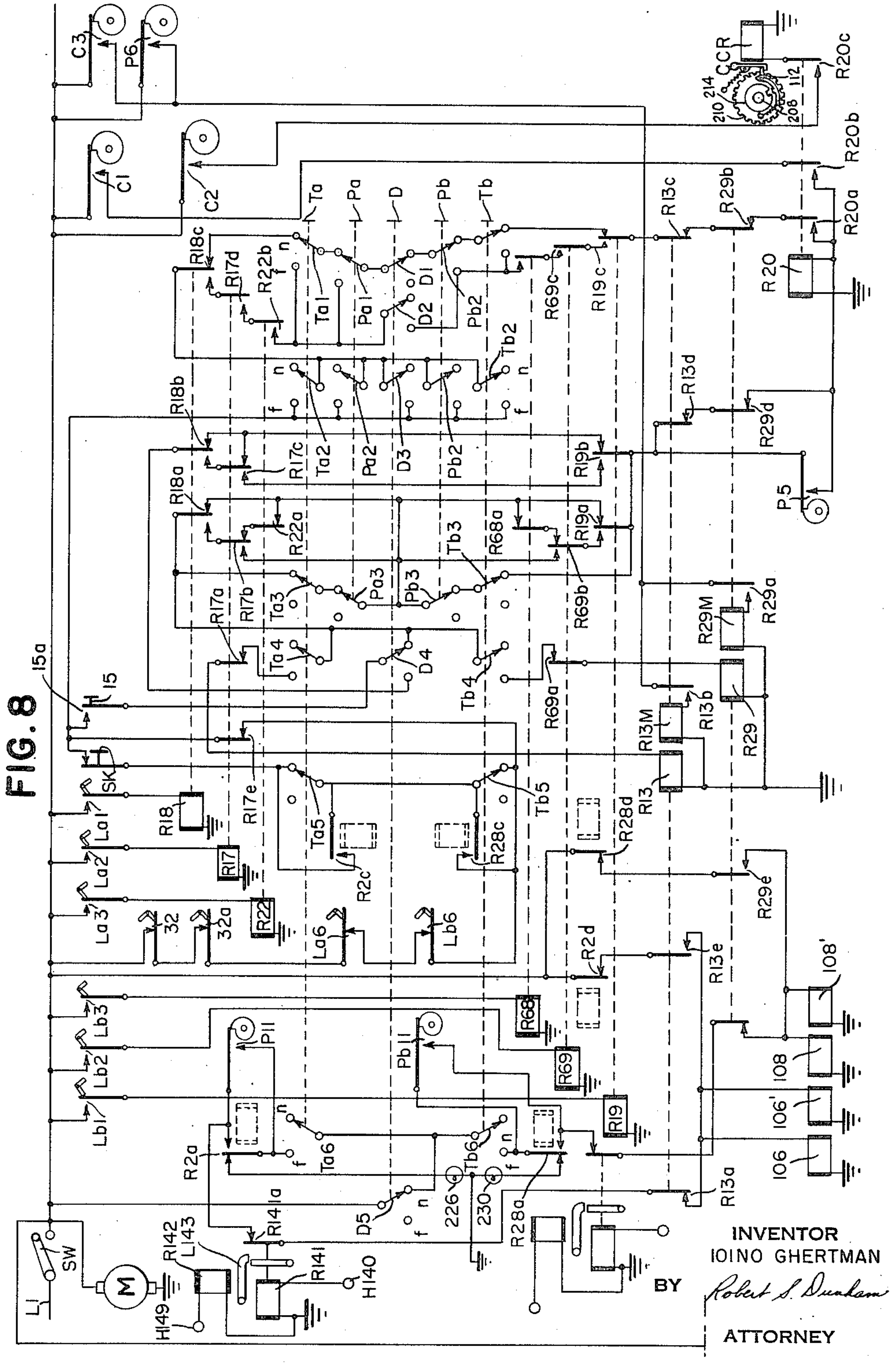
Figure 9:
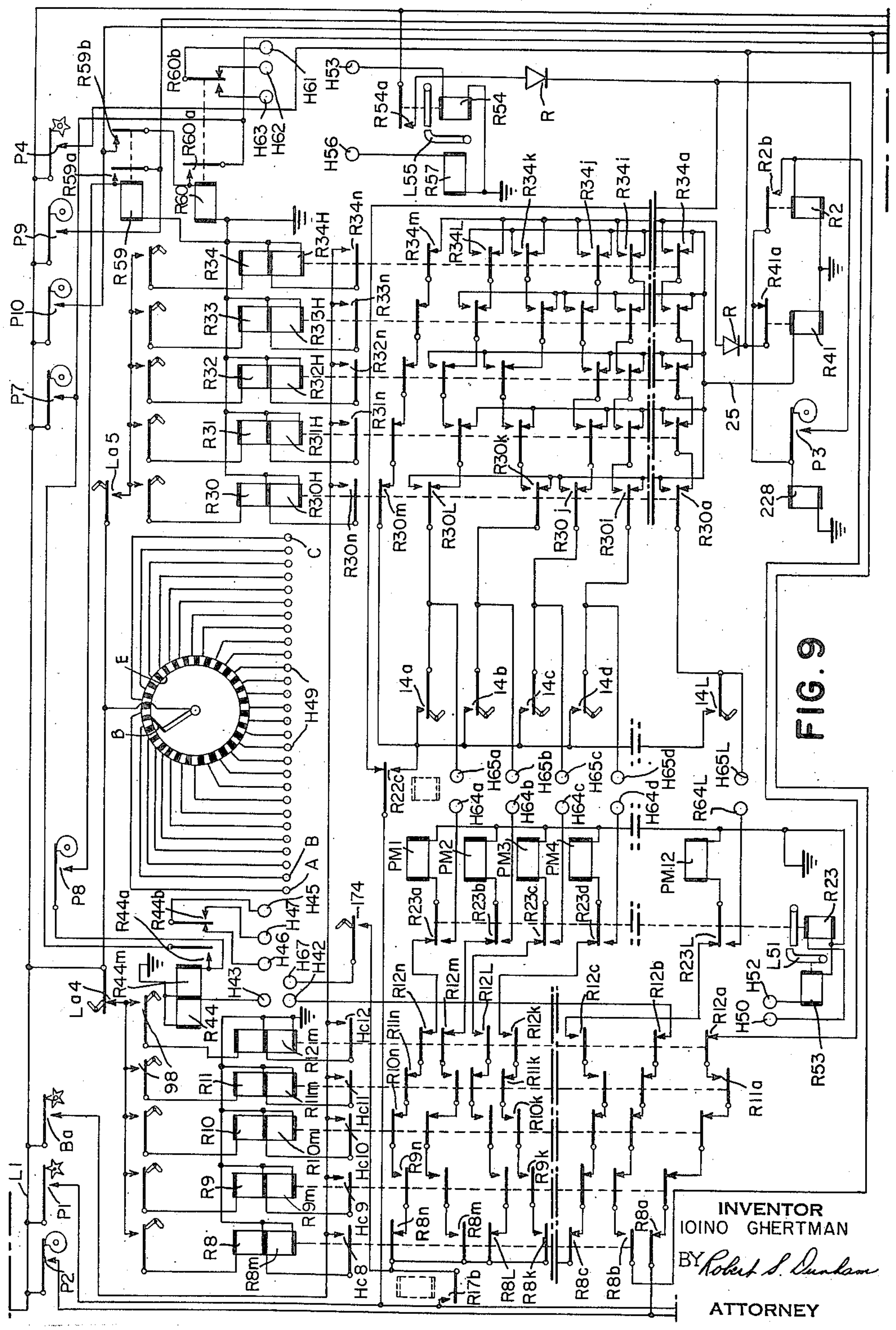
Figure 10:
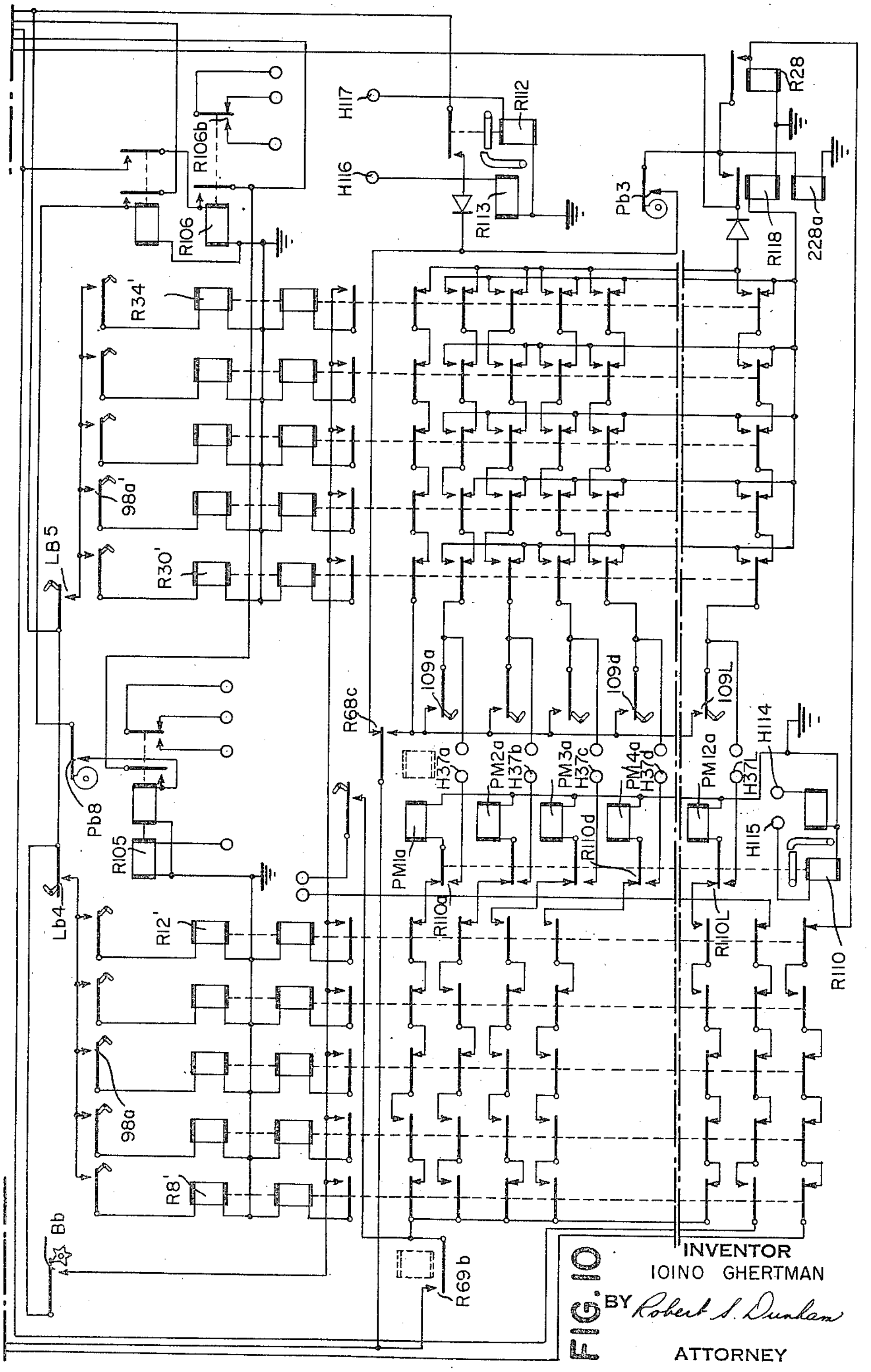
Figure 12:
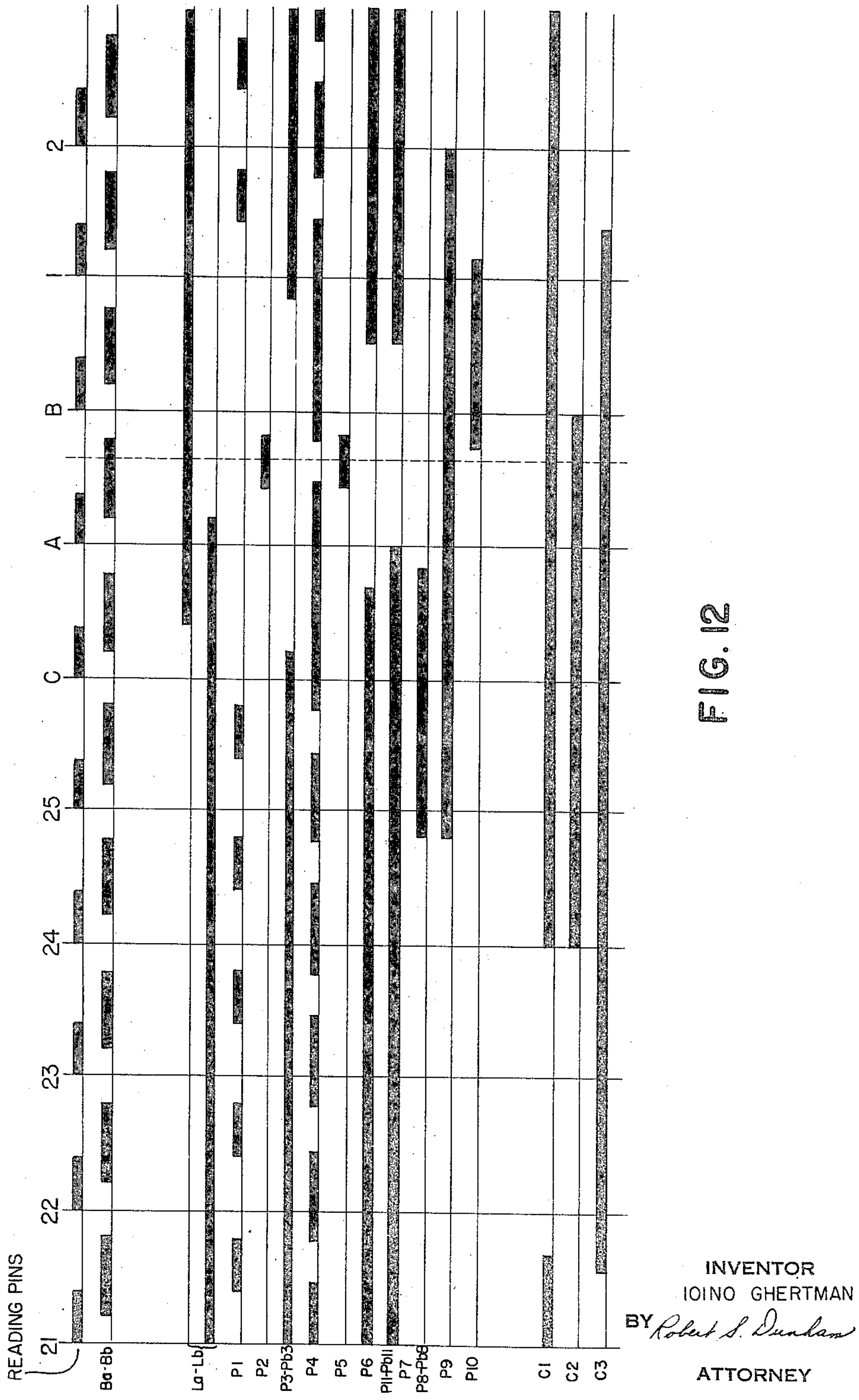

Figs. 8, 9 and 10 taken together show the electrical control circuits embodied in the machine;

Fig. 11 is a reproduction of Fig. 5 of C. D. Lake Patent No. 2,032,805 showing a Geneva drive arrangement for feeding record cards under reproducing punches in step-by-step progression;

Fig. 12 is a timing diagram; and

Figures 2, 3, 13:
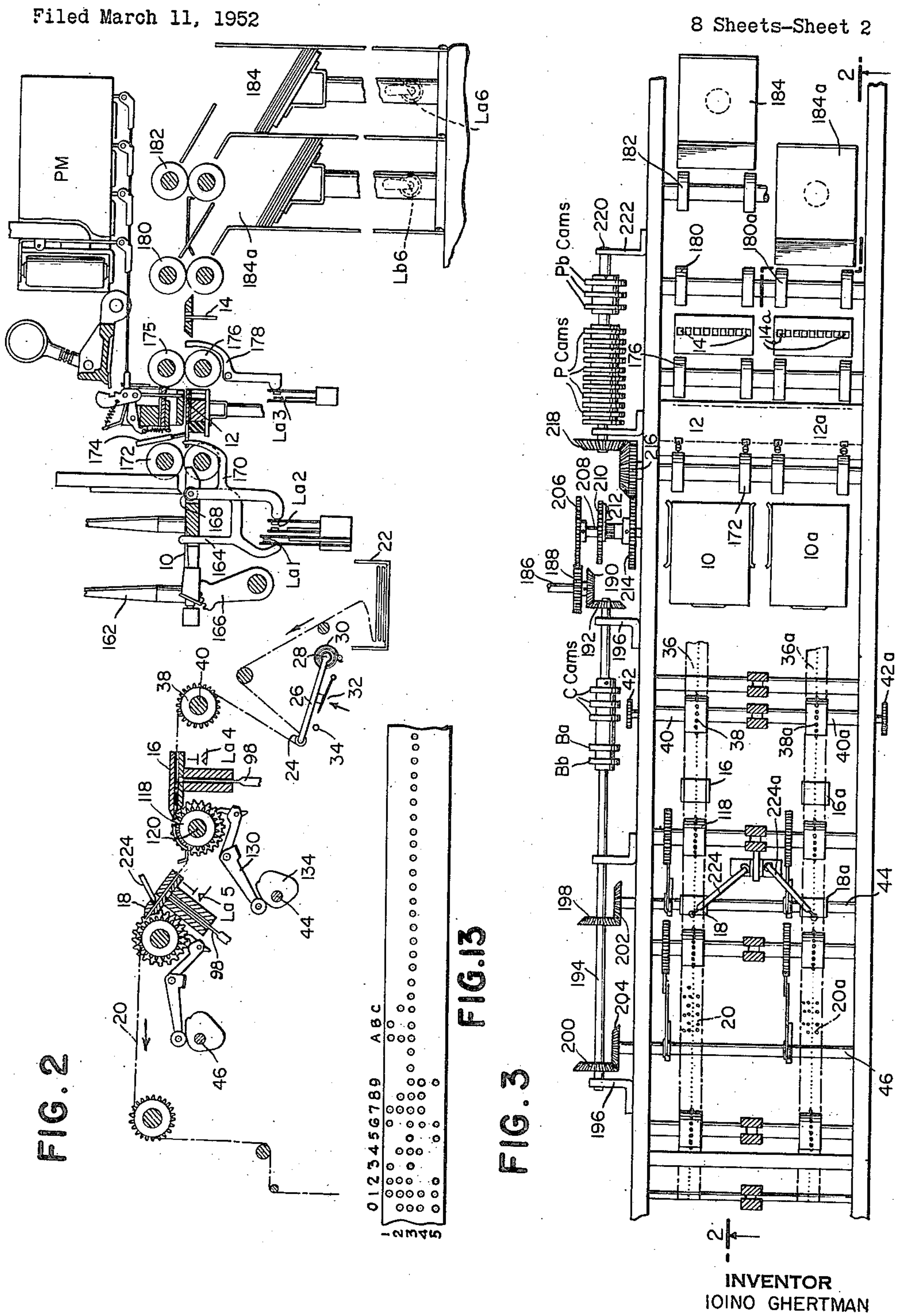
Fig. 2 is a schematic view in vertical section, taken along the line 2—2 of Fig. 3, representing the essentials of the mechanism.
Fig. 3 is a schematic top plan view illustrating the mechanism.
Figure 4:
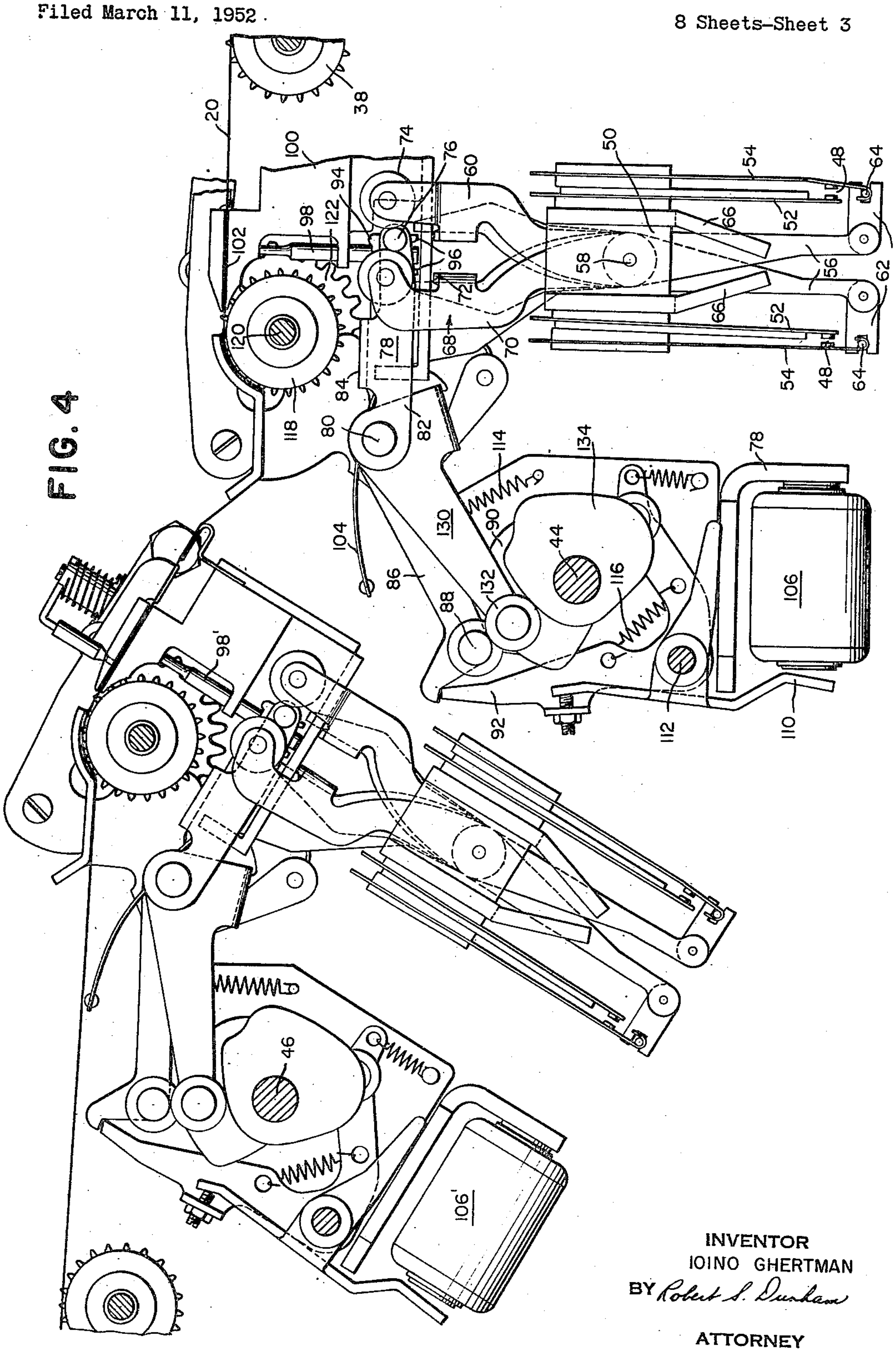
Fig. 4 is a sectional view through a pair of tape reading heads constituting a tape reading station.

Fig. 13 is a section of a perforated control tape.

By reference to Fig. 3 of the drawings it will be seen that the mechanism comprises a pair of card magazines 10 and 10*a*, a card punching station composed of two sets of punches 12 and 12*a*, two sets of punched card reading brushes 14 and 14*a* and two tape reading stations comprising reading heads 16—18 and 16*a*—18*a* for reading control tapes 20 and 20*a*, respectively, together with appropriate card and tape feed devices. The foregoing combination of instrumentalities comprises a pair of parallel card processing and tape handling mechanisms. The paired mechanisms are structural duplicates of each other, and in view thereof a description of one set of each mechanism will serve as a description of both. In the drawings corresponding duplicate elements bear the same reference numeral with the suffix *"a."*

For the purpose of more detailed description, reference may be had to Fig. 2 of the drawings which is on line 2—2 of Fig. 3. In Fig. 2 the control tape 20, herein shown as a perforated tape, is fed from a suitable source of supply 22. The tape 20 is trained about a guide roller 24 carried at the free end of a spring-biased pivoted lever 26. The lever 26 is mounted for rocking movement on a pivot pin 28. A spiral spring 30 biases the lever 26 in a counterclockwise direction and normally maintains a contact 32 in closed position. A stop 34 limits the counterclockwise movement of the lever 26.

Should there be an impediment to the free feed of control tape from its source of supply 22, continued feeding of the tape 20 will elevate the lever 26, thereby breaking the contact 32 which automatically stops the machine after the recording of the data relating to a particular tape field. The position of the stop 34 is adjustable, so that the tape loop formed about the guide roller 24 is sufficient for the punching of data relating to one tape field before rupture of the tape may occur. The tapes have feed perforations 36 and 36*a* which are adapted to engage with feed sprockets 38 and 38*a* fixed to shafts 40 and 40*a*, respectively. The shafts 40 and 40*a* are mounted for independent manual rotation in the frame by means of knobs 42 and 42*a*.

The coded values punched into the tapes 20 and 20*a* are read by means of sensing pins in the several reading heads. Each of the tape sensing stations includes a tape reading head 16—16*a* from which the associated card punch unit is controlled and a comparing head 18—18*a* which is used in conjunction with the associated card reading brushes 14—14*a* for comparing a perforated card with the area of the tape under control of which the card was perforated. The reading heads 16 and 16*a* are driven from a constantly rotating shaft 44, while the comparing heads 18 and 18*a* are driven from a constantly rotating shaft 46. The tape feeding and reading mechanism is based on that shown in the application of Edwin O. Blodgett, Serial No. 173,320, filed July 12, 1950, and only so much of that tape reading mechanism will be described herein as necessary to render its function and association herein intelligible.

Each of the four tape reading heads are of identical structure and each includes a plurality of paired electrical contacts 48 which are disposed in opposite rows on a supporting structure 50 which is mounted on a suitable base. Inasmuch as the present device is designed to sense any one of five holes, or any combination thereof in the control tape, there are five contacts under the control of tape perforations. The contacts in the oppositely disposed rows are arranged in staggered relation so that they may be individually controlled by interposer mechanism which will be more fully described at a later point.

Each contact device consists of a fixed conducting strip 52, one end of which carries a contact point, and a resiliently movable conducting strip 54, which carries a contact point in registration with the one on the fixed strip 52 with which it is paired. The resilient conducting strip 54 is normally biased to tend to close the contact points. Each contact device, however, is held open, except when a corresponding tape perforation appears, by means of an offset contact lever 56 which is mounted for limited swinging movement on a pivot shaft 58. Each of the contact levers 56 has a free end 60 which when moved outwardly causes the contact operating end thereof to move outwardly. The contact operating end of each lever has pivoted thereto a short, outwardly extending projection 62 which is notched to engage an inwardly extending section 64 of the associated resilient contact strips 54. As a result of this structure, when the upper free ends 60 of the contact levers 56 are moved outwardly the lower ends move outwardly, whereby the contact points on the associated circuit maker are opened.

The contact levers 56 are guided in their movement by a pair of guide combs 66, and the movement of each set of these levers is partially under control of a contact lever bail assembly 68, one such bail assembly being associated with each row of contact levers, which are adapted to engage the upper free ends 60 of the contact levers. Thus, when the contact lever bail assemblies 68 are moved toward each other, any contact lever which is at such time otherwise free will allow its associated resilient conducting strip 54 to move inwardly to close the contacts thereof. Each contact lever bail assembly includes a pair of legs 70, interconnected by a contact lever bail 72 (Fig. 6). The legs 70 are pivoted on the pivot shaft 58, and the other end of each has mounted thereon a roller 74. The contact lever bail assemblies are interconnected by a spring 70′ whereby they are urged toward each other, but they are kept in normally separated position by means of interposer bail studs 76 which are adapted to move between the rollers 74 at each end of the assembly. When the studs 76 are disposed between the rollers 74, the contact lever bail assembly is separated, the contact lever bails 72 are in contact with the free ends 60 of the contact levers 56, and as a consequence the contact points of the circuit makers are open.

The studs 76 are carried by an interposer bail assembly 78 which in turn is pivoted on a pivot shaft 80. The interposer bail assembly 78 includes a pair of spaced side arms 82 on the free end of each of which is located the interposer bail stud 76 and from which it projects into position between the rollers 74. An interposer bail 84 interconnects the side arms 82 of the interposer bail assembly, and this bail is adapted to overlie and to control a series of interposers as will more fully appear hereinafter. Furthermore, the interposer bail assembly has attached thereto an interposer bail arm 86 by means of which the forwardly projecting arms 82 may be rocked about the pivot shaft 80 on which they are mounted. The free end of the interposer bail arm 86 has a cam follower 88 mounted thereon adapted to operate in contact with an interposer bail cam 90 when the interposer bail arm 86 is released from the influence of a control arm 92, as will be more fully explained hereinafter.

The operation of the tape controlled contact assembly is under the ultimate control of a series of interposer arms 94 and attached tape reading pins, one such arm being provided for each tape controlled contact lever. As best seen in Fig. 6 of the drawings, the interposer arms 94 are freely pivoted on the shaft 80 on which they are mounted, and each consists of a lever having a pair of interposer shoulders 96 formed at the free end thereof. One shoulder 96 of each interposer arm will be associated with the free end 60 of its corresponding contact lever. The inoperative or non-reading position of the interposer arms is shown in the drawings. In this position the shoulders 96 are in blocking or interposed relation with their associated contact levers. It will be seen, therefore, that even though the contact lever bails 68 are released, any contact lever whose interposer arm 94 is in blocking position will be restrained from movement and consequently its associated contact will remain open.

Attached to each interposer arm is a tape hole reading pin 98 which is guided for reciprocating movement in a reading pin guide block 100. The path of the reading pins 98 intersects a tape feed throat 102 in the guide block 100. As a perforated tape is fed through the tape feed throat 102, the reading pins 98 are in light contact therewith by reason of the fact that each interposer arm 94 is under the influence of a light spring 104. The tension of the spring 104 is insufficient to cause any damage to a control tape being read. However, the spring tension is sufficient to cause a reading pin 98 to enter a tape perforation in alignment therewith at the reading station. When this relationship is present, the corresponding pin 98 will enter the tape perforation, causing the interposer arm 94 to swing on its pivot shaft 80 sufficiently to withdraw the blocking interposer shoulder 96 from the path of its associated contact lever. Under these conditions when the contact lever bails 72 are moved inwardly away from the free ends 60 of the contact levers, a contact lever thus freed will move sufficiently to close its associated contact points. In the absence of a perforation in the tape, the reading pins will rest lightly on the surface thereof, thus preventing the associated interposer arms 94 from moving out of the path of their associated contact levers, thereby blocking the levers against movement and avoiding the operation of their associated contacts. It will be noted in Fig. 6 that the interposer bail 84 overlies and is adapted to contact the upper edge of the aligned interposer arms.

The interposer arms 94 and consequently the reading pins 98 are retained in non-reading position by the interposer bail 84 until the interposer bail arm 86 is released by the control arm 92. Such release follows energization of a control magnet 106 in connection with which operates an armature 110 which is pivoted on a stud shaft 112 and about which the armature may rock. The control arm 92 is likewise pivoted on the stud shaft 112.

The interposer cam 90 and a tape feed cam, as will appear hereinafter, are mounted for rotation with the cam shaft 44. When an energizing current is present in the control magnet 106, the armature 110 is attracted to the magnet core with the result that the control arm 92 is rocked in a counterclockwise direction, thereby releasing the interposer bail arm 86. The interposer bail arm 86 is under the influence of a spring 114 which is effective to draw the cam follower 88 of the interposer bail arm into contact with the interposer bail cam 90. As the interposer bail cam 90 rotates, the interposer bail arm 86 rocks about the pivot shaft 80 and elevates the interposer bail assembly 78. As a result of this action the interposers 94 are permitted to rise under the influence of their respective springs 104, and the reading pins 98 will enter any tape perforations that are presented in alignment with the respective pins. When one or more of the pins enters a perforation in the tape, the interposer 94 associated therewith moves sufficiently to free the interposer shoulder 96 from blocking engagement with its associated contact lever 56 so that when the interposer studs 76 move from between the contact lever bail rollers 74, the contact lever, or levers, thus freed of the interposer shoulders will move inwardly under the influence of the resilient contact strip 54 and permit contacts of such operated contact lever, or levers, to close.

As the interposer bail cam 90 rotates and its high point rides in contact with the interposer bail cam follower 88, the interposer bail arm assembly is rocked in a clockwise direction about its pivot shaft 80 and the control arm 92 is moved inwardly under the influence of a spring 116, so as to be in position to intercept the latch end of the interposed bail arm 86 as it drops, thereby holding it out of further contact with the interposer bail cam 90 and sustaining it against the influence of the spring 114. In this position the reading mechanism will again be latched, the interposed bail 84 having lowered the interposer arms 94 into contact lever blocking position and the contact levers having been separated by contact with the contact lever bails 72 upon separation of the contact lever bail assembly structure by the interposer bail studs 76. A second tape reading operation cannot follow, therefore, until the control magnet 106 is once again energized.

The perforations in the tape are arranged in transverse rows that are equally spaced, and it is contemplated, therefore, that as the tape is moved through the reading throat 102 in step-by-step progression, the successive rows of perforations will present themselves at the reading zone in alignment with the reading pins. For the purpose of achieving a regulated feeding of the tape through the reading zone, there has been provided a tape feeding mechanism which is shown in detail in Fig. 5 of the drawings to which reference may now be had. The tape is provided along its length with sprocket holes 36 with which the teeth of a pin wheel 118 are adapted to engage for feeding the tape through the reading throat 102. The pin wheel 118 is carried by a shaft 120 which is rotated by a feed ratchet wheel 122. The feed ratchet wheel 122 has peripheral teeth which are periodically engaged by a feed pawl 124 for rotating the feed ratchet wheel as may be required for the proper feeding of the tape. The feed pawl 124 is pivoted on a stud 126 carried at one end of a feed pawl operating lever 128. The operating lever is mounted on its pivot shaft 80 for limited rocking movement thereabout, and it includes a feed pawl operating arm 130 on the free end of which is mounted a cam follower 132 adapted to contact a tape feed cam 134 mounted for rotation with the cam shaft 44. The feed pawl 124 is moved through its feeding stroke by means of a relatively strong spring 136 which has one end thereof attached to the pawl and the other end thereof to a fixed pin 138. It will appear, therefore, that whenever the feed pawl operating assembly is free to rock about the pivot shaft 80, the end of the feed pawl 124 will be forced into operating engagement with the teeth of the feed ratchet wheel 122 under the influence of the operating spring 136.

A feed pawl stop 140 is carried by the feed pawl operating lever 128 in such position as to limit the counterclockwise movement of the feed pawl 124. A stop 142 is positioned to limit the clockwise movement of the feed pawl 124. Between the two stops 140 and 142, the feed pawl 124 is therefore restrained to a predetermined path of movement as it functions to drive the feed ratchet wheel 122.

Restoration of the feed pawl 124 to inoperative position is under the influence of the tape feed cam 134. When the tape feed cam 134 rotates with its high point in contact with its cam follower 132, the feed pawl 124 is withdrawn to its inoperative position.

In order that the tape feed mechanism may be operative only when tape reading is desired, there has been provided a feed pawl latch 144 which is pivoted for rocking movement about a pivot shaft 146. The feed pawl latch 144 is urged to rock about its shaft 146 in a counterclockwise direction under the influence of a spring 148, but the same is normally held against such rocking movement by one of the contact lever bails 72.

Pivoted on the feed pawl latch 144 is a latch control lever 150 which has an extension 152 normally adapted to lie in contact with one of the contact lever bails 72. A spring 154 interconnects the feed pawl latch 144 and its control lever 150 so that counterclockwise movement of the control lever 150 imparted thereto by the contact lever bail 72 is transmitted to the feed pawl latch. The feed pawl latch has a hooked free end 156 adapted to engage over a shoulder provided on the end of the feed pawl operating lever 128.

It will appear, therefore, that as the feed pawl operating assembly is rocked into inoperative position under the influence of the tape feed cam 134, and as the contact lever bail 72 moves outwardly, the hooked end 156 of the feed pawl latch 144 will engage over the shoulder of the feed pawl operating lever 128 and hold the feed pawl operating assembly in inoperative position. Upon the next succeeding tape reading operation the contact lever bails 72 will move inwardly, thereby releasing the control lever 150 and permitting separation of the feed pawl latch 144 and the feed pawl operating lever 128 under the influence of the feed pawl latch spring 148. This will free the feed pawl operating assembly for a tape feeding operation.

A feed ratchet wheel detent 154*a* is pivoted on the support casting by means of a pivot screw 156*a*, and it is rocked in a counterclockwise direction under the influence of a spring 158 so that a roller 160 on the free end of the detent arm is in contact with the teeth of the feed ratchet wheel 122, thereby providing a stabilizing influence for the rotary operation of the feed ratchet wheel and consequently its associated tape feeding pin wheel.

The card feeding, punching and reading mechanism corresponds in general to the card feeding, punching and reading mechanism at the right of Fig. 3 in the C. D. Lake Patent No. 2,032,805 or its Reissue No. 21,133, only such changes having been made as required for the column by column feed of cards through such mechanism and the column by column sensing of transverse holes in the tapes. In this regard it may be noted that it is contemplated herein to operate on cards having 28 columns, 25 columns for recorded card data and 3 columns for functional signals A, B and C.

In the reproducing machine of the aforesaid Lake patent there is employed a fourteen-point cycle, whereas a twenty-eight point cycle is contemplated herein. As a consequence of this change, the drive ratio of the reproducing mechanism is reduced to a ratio of 1:2 to reduce the speed of card feed through the reproducing section of the machine. Furthermore, the card herein is advanced through the card feeding mechanism in steps of .087 inch in order to accommodate it to column by column feed, instead of the ¼ inch prevalent in the aforesaid Lake patent which was necessary for the line by line feed. It may also be specifically mentioned herein that each of the punch units 12 and 12*a* comprises twelve punch elements rather than the larger number ordinarily found in machines according to the Lake patent. Since it is contemplated to feed the cards herein under the punches 12 and 12*a* in column by column order, the individual punch elements are turned through 90° from the position occupied by them in the reproducing perforating machines in common use today. This is dictated by the fact that the punch in the reproducing machines of the Lake type has a rectangular cross-section, which must always bear the same relation to the index position of the card so that the card may be read ing digit-by-digit fashion, as is common in card reading mechanism.

The card magazines 10 and 10*a* have a plurality of posts 162 adapted to retain a deck of cards. The presence of a card in the magazine 10 is sensed by a card lever 164, which is adapted to close a card lever contact L*a*1. A similar card lever is provided for cards from magazine 10*a* to control contact L*b*1. The conventional picker mechanism 166 is adapted to engage the bottom card of a deck in the card magazine 10 and advance the same through a card throat 168 where it engages a second card lever 170 which is adapted to control contacts L*a*2. A similar card lever is provided for the cards from card magazine 10*a* to control contact L*b*2. A pair of feed rollers 172 engage the card and advance the same to the punching station 12. As the card passes the feed rollers 172, a control brush 174 is adapted to read special control holes therein.

The punch control magnet unit PM has been shortened, since it contains only 24 magnets instead of the customary 80 ordinarily provided in the reproducing punch of the type shown in the Lake patent.

The cards passing through the punching station 12 are engaged by a second set of feed rollers 176, which serve to feed punched cards over the comparing (or checking) pins 14. A card sensing lever 178 extends into the card course between the second set of feed rollers 176 and the comparing pins 14, so that presence of a card at that point will cause the lever 178 to close a contact L*a*3. A similar lever lies in the path of cards from magazine 10*a* to close contact L*b*3 in the presence of a card. Beyond the comparing pins 14 is a third pair of feed rollers 180 and a final pair of feed rollers 182. The rollers 180 and 182 discharge punched and compared cards from magazine 10 into card pocket 184. The rollers 180*a* (Fig. 3) discharge punched cards from magazine 10*a* into the card pocket 184*a* (Fig. 3).

The card trays within pockets 184 and 184*a* are spring-supported in known manner and are adapted to operate contacts L*a*6 and L*b*6, respectively, when the pockets are filled to capacity.

The drive mechanism is schematically shown in Fig. 3 of the drawings. When the motor M (Fig. 8) is energized, it is suitably connected to drive a shaft 186. The shaft 186 has fixed thereto a pinion 188 and a bevel gear 190. The bevel gear 190 is in mesh with a bevel gear 192 fixed to a shaft 194 mounted for rotation in brackets 196. The shaft 194 also has fixed thereto a pair of bevel gears 198 and 200. These gears are in mesh with bevel gears 202 and 204, respectively, the latter being fixed to cam shafts 44 and 46 respectively, which constitute the drive means for the tape reading stations. The shaft 194 has mounted for rotation therewith the C cams and the B*a* and B*b* cams.

The pinion 188 also meshes with a pinion 206. The pinion 206 is fixed to a shaft 208 which corresponds to the shaft 31 in the aforementioned Lake patent. The shaft 208 also carries a pawl disc 210, whose pawl 212 is operated under the influence of a card clutch control magnet CCR, Fig. 8. The clutch pawl 212 is effective to cause rotation of a gear 214 which is in mesh with a gear 216, through which drive is transmitted to the various card feeding rollers in a manner taught in the aforementioned Lake patent.

The gear 216 has a beveled surface which is in contact with a bevel gear 218 on the end of a shaft 220 mounted for rotation in brackets 222, the shaft 220 having mounted thereon the P cams for rotation with the shaft.

It will be seen from the foregoing that the shaft 194, the cams mounted thereon, and the tape reading station cam shafts 44 and 46 are constantly driven, while the card feeding and punching gear train and the shaft 220 on which the P cams are mounted are driven intermittently depending on energization of the card clutch control relay CCR.

Before describing the control circuits in detail, it may render the description somewhat easier if we include a short description of the several functions within the capacity of the machine.

*Transcription operation.*—This operation consists in running a control tape through either or both the tape reading heads 16 and 16*a* while one or several cards from either or both card magazines 10 and 10*a* are run under the punching units 12 and 12*a*.

Both tapes and both punching units may be employed simultaneously or either may be employed separately. Accordingly a description of operation under control of tape 20 will suffice. Each data item registered in a punched column of the tape 20 is scanned by the reading head 16, is translated from a multiposition code to a single position code ("single position code" when used herein is intended to include also a conventional alphabetic card code wherein a single numeric index point hole is used in combination with a zone hole to represent a letter of the alphabet) commonly used in perforated record card work, and punched according to the single position code in the card column located under the punching unit 12. When the data pertaining to one group has thus been punched into a card, the columns of the card which have just been punched are run under the comparing brushes 14. As a card column runs under the brushes of the comparing station 14, the corresponding column of the control tape 20 is over the pins in the reading head 18, whereby the record data of the tape is compared with the card punched under control thereof. If the card that has been punched compares with the tape section from which the punching was controlled, the operations just described are resumed automatically. If, on the contrary, one or several errors are detected during the comparison of the punched card, a special indication is printed on the corresponding columns of the tape by means of a stylus 224 (shown in detail in Fig. 7) and the machine stops after the checking of the whole card is completed. Signal lamps 226 or 230 are used to apprise the operator that the machine has stopped and that an error has occurred in punching a card from one of the two sections of the machine.

*Group punching operation.*—It is frequently desired to record certain permanent data in a group of cards either with or without the recording of variable data in such cards. When permanent data is to be reproduced from the tape on a group of cards, such data need only be recorded in the tape once at the beginning of the group.

The entire tape field for a card in accordance with the present invention is adapted to contain 25 data items, each to be reproduced in 25 columns of the card. Between each tape data group are three special columns A, B and C (Fig. 12) which are adapted to contain functional codes through which certain control signals may be produced. If a number of cards are to receive the same data, such data is punched in the control tape in the first field only, succeeding tape fields are left blank, and a special code is provided in column B of the preceding field. Control circuits which will be described in greater detail at a later point are brought into action for the control of the reproducing punches when a code punched in column B is detected. Under such conditions the operation of the machine is modified as follows.

The mechanism reproduces in a card the data from the first field of the tape in normal fashion, and this normal transcription takes place until the first column of the field in the second card is reached where the permanent data is to be punched. A special circuit controls the action of the punch magnets, not under control of the tape reading unit as before, but rather under control of the card reading pins 14 under which the first card punched is now running and from which the permanent data punched therein is being sensed by the pins 14. The permanent data recorded in the first card is thus recorded in the following card.

As soon as the punching of the field preserved for permanent data is completed, the punch magnets are once more placed under control of the tape reading unit 16, and the punching operation continues under control of the tape until the transcription of variable data has been completed. This group punching operation as to permanent data from the preceding card takes place whenever a special code in column B of the tape is detected by the tape reading unit 16.

If the permanent data is to be punched into a large number of cards, it is punched once in the first field of the tape, as just explained, but instead of leaving blank the corresponding columns in the following tape fields, the variable data may be recorded there successively so that the number of tape columns employed is reduced. To this end a special punched hole is provided at the beginning of each of these variable data fields. If, for instance, the number of columns required by permanent data is 6, 19 columns will remain available in each group instead of 25. This method of procedure results in an important saving of recording time. As in the preceding example, each tape field is divided from the following by three columns A, B and C. Let it be assumed that the first ten columns are preserved for variable data, the six following columns for permanent data, and the last nine columns for other variable data, the first group of 25 columns is read from the tape and recorded in the card in accordance with normal transcription procedure. When the second card reaches the punching station 12, the first ten columns are also punched by means of the normal transcription circuits. However, as the permanent data is not recorded in the subsequent tape fields, the 11th column of the tape will no longer correspond to the corresponding column of the card.

A special device, the operation of which is controlled by the detection of a punched hole in column B of the tape, allows the tape to stop, thereby eliminating verification and placing the pick-up circuits of the punch magnets under control of the card reading station 14. Thus the punching of permanent data on the second card is under control of the card just previously punched.

When this punching operation is completed, the tape feed mechanism is started again and the pick-up circuits of the punch magnets are once more placed under control of the tape reading station 16. Circuits which will be explained later eliminate verification operations during the running of a tape group whose column capacity is less than 25.

When a tape section has no further control holes in the column B position, the normal circuits of the machine are re-established with the result that the corresponding card passes under the card reading station 14 without effect on the punch mechanism as the succeeding card enters the punch.

The next series of tape fields may also bear other permanent data which will be reproduced on all the following cards providing the latter are punched in column B. It is thus possible to reproduce on some cards the permanent data punched in various sections of the tape.

*Miscellaneous operations.*—A card file placed in feed hopper 10*a* may also be reproduced on a deck of cards placed in feed hopper 10 or vice versa. It is also possible to gang punch cards not from the control tape but from master cards incorporated in the different files. These master cards are characterized by a control hole punched in a determined column which is detected by the reading brushes 174. The detection of these special punched holes results in the automatic reproduction of the master card data into all the following cards. These operations are known to the art and may be combined with the features which characterize the present invention.

*Description of the circuits.*—In the interest of clarity we shall confine our circuit description to the recording of data on cards in card hopper 10 under control of tape 20. However, reference may be made to Fig. 12 whenever it is necessary to ascertain the time at which the various cam contacts are made. Furthermore, it will be noted from an inspection of the circuit diagrams that the circuits of Fig. 10, which control recording on cards from card magazine 10*a* under control of tape 20*a*, are substantially the same as those in Fig. 9 of the drawings which are for the control of recording on cards from magazine 10 under control of the tape 20. Contacts L*a*4 and L*a*5 are closed as soon as the tape 20 is inserted in the tape reading unit 16—18. The operator closes the main switch SW and also the recording switch T*a* which controls six contacts T*a*1 to T*a*6 as shown in Fig. 8 of the drawings. Closure of the main switch SW energizes the signal light 226 through the following circuit: Power line L1, main switch SW, switch contact D5, contact T*a*6 (*f* position), contact R2*a*, lamp 226 and ground. The object of this signal lamp is to give a warning whenever the machine is not in proper running condition.

In conditioning the machine for operation, it is first required that the tape 20 be positioned so that the first data column therein is in reading position in the reading head 16 as the first column of a card from magazine 10 is under the punches of punch unit 12.

This condition is automatically achieved when the operator depresses a start key 15 which closes contact 15*a* included in the folowing circuit: Line L1, main switch SW, tape tension contacts 32 and 32*a*, card pocket levers L*a*6 and L*b*6, contact R17*e* (normally closed), start key contact 15*a*, reproducing contact D4, first tape recording control contact T*a*4 (now closed), contact R17*a* and relay R13. The pick-up relay R13 causes the opening of contact R13*a* which cuts the normal pick-up circuit of the first reading station clutch control magnets 106 and 106'. Under these conditions the tape is at rest, since the cam follower 132 does not contact the tape feed cam 134. The holding coil R13*m* for relay R13 is energized by closure of contact R13*b* included in the following circuit: Line L1, switch SW, cam contacts C3 and P6, contact R13*b*, holding coil R13*m* to ground.

The closing of contact R13*e* results in the pick-up of magnets 106 and 106' which control the action of the reading station 16—18. This result is achieved through the following circuit: Line L1, switch SW, normally closed point R2*d*, now closed point R13*e*, magnets 106 and 106'. The pick-up of magnets 106 and 106' causes the reading of the tape 20 column by column until relay R2 (Fig. 9) is energized. When this action occurs contact R2*d* is opened and breaks the circuit previously described. Thereafter the tape 20 remains in the same position until relay R13 is deenergized.

It may be well to note at this point that the switches T*a* and P*a* control respectively recording and gang punching from tape 20, and that switches P*b* and T*b* control respectively gang punching and recording control from tape 20*a*. The switch D controls normal reproducing from either card.

Therefore, if the switch T*b* is closed, i. e. the contacts moved to the "*f*" position, relay R29 is energized by a circuit extending from line L1, through switch SW, tape tension contacts 32 and 32*a*, card pocket levers L*a*6 and L*b*6, contact R17*e*, start key contact 15*a*, points D4 and T*b*4, normally closed contact R69*a* and relay R29. The closing of contact R29*e* causes the pick-up of magnets 108 and 108' until relay R28 is energized. Magnets 108 and 108' are energized through the following circuit: Line L1, switch SW, point R28*d*, point R29*e* and magnets 108 and 108'. When relay R28 is energized, the tape 20*a* remains in the same position as explained in respect to the first tape.

The closing of contact 15*a* also causes pick-up of relay R20 which is energized in parallel with relay R13 as follows: Line L1, switch SW, tape tension contacts 32 and 32*a*, card pocket levers L*a*6 and L*b*6, point R17*e*, start key contact 15*a*, switch D4, point R18*a* (now transferred), point R17*b*, point R22*a*, point R19*a*, cam contact P5, relay R20 to ground.

The closing of cam contact C2 causes the machine to clutch-in by means of card clutch control magnet CCR which is energized from line L1 through switch SW, cam contact C2, point R20*c*, magnet CCR to ground. Consequently, when cam contact C2 causes the energization of card clutch control magnets CCR, the first column of the card is running under the punches at the same time the first column of the tape is being sensed by the reading mechanism.

The cams B*a* and B*b* on shaft 194 are constantly running. Thus cam B*a* is adapted to hold relays R8 to R12, shown in Fig. 9 of the drawings. These relays pick up as follows: Line L1, switch SW, tape contact L*a*4, reading pin contact 98, control contacts in reading unit 16, relays R8 to R12 corresponding to a closed pin contact, and then to ground. The holding circuit for relays R8 to R12 is the following: Line L1, switch SW, cam contact B*a*, contacts HC8 to HC12 corresponding to picked up relays and then to the corresponding holding coils R8*m* to R12*m*. As soon as a single punched hole in row 2 of the tape column A is detected by reading pin 98, a circuit similar to the preceding circuit is completed which results in the pick-up of relay R11 which is held as follows: Line L1, switch SW, cam contact B*a*, contact HC11, holding coil R11*m* and to ground. Relay R11 also closes contact R11*a* included in the following circuit: Line L1, switch SW, cam contact P2, points R8*a*, R9*a* and R10*a* (normally closed), point R11*a* (now closed), contact R12*a*, relay R2 and ground.

Relay R20 (Fig. 8) is energized as follows: Start key contact 15*a*, switch D4, transferred contact R18*a*, contacts R17*b*, R22*a*, R19*a* (not transferred), cam contact P5, relay R20 and ground.

Relay R18 is energized as soon as the cards are stacked in card magazine 10. The pick-up circuit of relay R18 is from line L1, through switch SW, card magazine lever contact L*a*1, relay R18, to ground. This relay is held until the supply of cards in the card magazine 10 is exhausted. Relay R20 is held as follows: Line L1, switch SW, cam contact C1, contact R20*b*, relay R20 to ground.

The closing of cam contact C2 causes the machine to clutch-in by means of the clutch mechanism 212 which is controlled by card clutch control magnet CCR energized from line L1, through switch SW, cam contact C2, contact R20*c*, card clutch control magnet CCR to ground. The card clutch control magnet CCR controls the rotation of the P cams on shaft 220 (Fig. 3) and allows the cards to be fed under the punching station 12. During this cycle, punch block card contact L*a*2 is closed by the action of the first card passing thereover. Its closing causes the pick-up of relay R17 through a circuit from line L1, through switch SW, punch block card lever contact L*a*2, relay R17 to ground. Relay R17 opens contacts R17*a*, thereby avoiding any further pick-up of relay R13 during the following cycles.

At the end of this cycle relay R20 drops out since cam contact C1 cuts the holding circuit which is as follows: Line L1, switch SW, cam contact C1, contact R20*b*, relay R20 and ground.

The holding coil R13*m* is also deenergized upon breaking of cam contacts C3 and P6. Since relay R20 is deenergized, the machine stops. When the operator again depresses the start key 15, relay R20 is picked up as follows: Line L1, switch SW, tape tension contacts 32 and 32*a*, card pocket levers L*a*6 and L*b*6, contact T*b*5, point R2*c*, stop key SK, start key contact 15*a*, point D4, point R18*a*, point R17*b*, point R19*a*, point R13*d*, point R29*d*, relay R20 and ground.

Relay R20 causes the pick-up of the clutch control magnet CCR through a circuit extending from line L1, switch SW, cam contact C2, point R20*c*, card clutch control magnet CCR and ground.

During this cycle relay R2 is held as follows: Line L1, switch SW, cam contact P1, point R22*c*, cam contact P3, point R2*b*, relay R2 and ground (Fig. 9). Relay R20 is held by cam contact C1 and contact R20*b*. During this cycle relay R22 picks up through the following circuit: Line L1, switch SW, card reader contact L*a*3, relay R22 and ground. The making of contact R22*b* allows relay R20 to be held after this cycle is completed through the following circuit: Line L1, switch SW, tape tension contacts 32 and 32*a*, card pocket levers L*a*6 and L*b*6, contact T*b*5, contact R2*c*, stop key contact SK, point T*a*2, point R18*c*, point R17*d*, point R22*b*, contact T*a*1, contact P*a*1, contact D1, contact P*b*1, contact T*b*1, point R19*c*, point R13*c*, point R29*b*, point R20*a*, relay R20 and ground. The running of the tape under reading station 16 results in the detection of the first data punched therein.

By way of example, let it be assumed that the first code to be read in the tape corresponds to punched holes in rows 1, 2, 3 and 5. This group of holes corresponds to the digit 1 in the International code. Consequently, with the code adapted for punching holes in the cards, it is necessary to energize punch magnet PM4 to record the digit 1 in a card. By reference to Fig. 9 of the drawings it will be noted that magnets PM1 through PM12 are indicated. These are the punch control magnets. The single position code used for recording on cards herein is in the order of 12, 11, 0, 1, etc. through 9, beginning at the first index point position at the top of a column and ending in the last index point position at the bottom of a column. Consequently, punch magnets PM1, PM2, PM3 and PM4 control punches representative of the digits 12, 11, 0 and 1, respectively.

The tape sensing pin 98 (Fig. 9) completes the pick-up circuits of relays R8, R9, R10 and R12 (as for the digit 1) as follows: Line L1, switch SW, tape contact *La*4, closed tape reading pin 98 contacts in the first, second, third and fifth positions, relays R8, R9, R10 and R12 in parallel and then to ground. These relays are held during a certain time indicated in Fig. 12 through which cam contact B*a* is closed. The holding circuit is from line L1, switch SW, cam contact B*a*, contacts HC8, HC9, HC10 and HC12, the corresponding relays and ground. When contacts R8*k*, R9*k*, R10*k* and R12*k* close, the following circuit is completed: Line L1, switch SW, cam contact P1, points R17*b*, R8*k*, R9*k*, R10*k*, R11*k* (normally closed), R12*k* R23*d*, punch control magnet PM4 and ground. The pick-up of the punch control magnet PM4 causes the punching of the digit 1 in the card.

It will be observed that the relay network under control of the relays R8 through R12 constitutes a translating circuit whereby the multiposition code, such as the International code, is translated to the single position code ordinarily used in punched record card work.

The foregoing example is deemed sufficient to indicate the manner in which the punch control magnets are energized, since these circuits are similar to those energized for punching other values. It should be observed that the number of relays R8 to R12 inclusive are dictated by the code used in the tape. Similarly, the arrangement of the corresponding relay contacts is dictated by the code used for punching the cards. The example herein given is merely by way of illustration, because the control circuits may be rendered responsive to the requirements of any coding system.

During the third cycle the first card runs under the card reading station 14. Simultaneously the data punched in the first tape field is detected by tape reading station 18. A comparison is made between the data just punched into the card and the original record in the tape which is being read in tape comparing station 18. If no error has occurred in the reproduction of the tape data, relays R30, R31, R32 and R34 (Fig. 9) are picked up as follows: Line L1, switch SW, comparing head tape contact *La*5, tape reading contacts of the pins 98′ of the comparing station 18, pick-up coils R30, R31, R32 and R34 to ground. The holding circuit is the following: Line L1, switch SW, cam contact B*a*, contacts R30*n*, R31*n*, R32*n* and R34*n*, the corresponding relay coils and ground. These relays cause contacts R30*i*, R31*i*, R32*i*, and R34*i* to be transferred. Under these conditions the following circuit is established: Line L1, switch SW, cam contact P1, point R22*c*, point 14*d* controlled by card reading station 14 which detects the digit 1 punched in the first card, contacts R30*i*, R31*i*, R32*i* (now transferred), and normally closed R33*i*, contact R34*i* transferred, rectifier R, contact R41*a*, point R2*b*, relay R2 and ground.

The holding circuit of relay R2 is controlled by cam contact P4 as follows: Line L1, switch SW, cam contact P4, point R41*a*, point R2*b*, relay R2 and ground. Therefore, as relay R2 is kept energized, relay R20 is held as follows: Line L1, switch SW, tape tension contacts 32 and 32*a*, card pocket lever contacts *La*6 and *Lb*6, contact T*b*5, contact R2*c*, stop key contact SK, contact T*a*2, point R18*c*, point R17*d*, point R22*d*, contact T*a*1, contact P*a*1, contact D1, contact P*b*1, contact T*b*1, point R19*c*, point R13*c*, point R29*b*, point R20*a*, relay R20 and ground. Relay R20 being energized, card clutch control magnet CCR insures a synchronized feeding of punched tape and cards.

If on the contrary an error occurs and the data punched in a card column fails to compare with the control data in the corresponding tape column, i. e. there is no comparison between data scanned by card reading station 14 and tape reading station 18, the relays in the comparison network may not be conditioned as required for comparison. Under such conditions relay R41 connected in line 25 (bottom of Fig. 9) will be energized. Relay R41 picks up as follows: Line L1, switch SW, cam contact P1, contacts R22*c*, contact point 14*d*, one of contacts R30*i* to R34*i*, line 25, relay R41 to ground. Contact R41*a* breaks, thereby blocking the holding circuit of relay R2 through the following circuit: Line L1, switch SW, cam contact P4, point R41*a*, point R2*b*, relay R2 to ground. This also prevents the pick-up of the relay through the circuits of the relay already described. Contact R2*a* (Fig. 8) restored to normal position brings into circuit the signal lamp 226 as follows: Line L1, switch SW, contact D5, contact T*a*6, point R2*a*, lamp 226 and ground.

Relay 106 is held energized until cam contact P11 breaks at column 27. Thus, feeding of the tape is halted to keep synchronism with the card feed.

During the following cycle card clutch control magnet CCR cannot pick up as contact R20*c* remains open so long as the holding circuit remains broken by the opening of contact R2*c*. The machine, therefore, stops only after an erroneously punched card has been completely checked. As soon as an error is detected, the stylus magnet 228 (Fig. 9, also Fig. 7) drops out. This action is concurrent with the dropping out of relay R2. The stylus 224 (Fig. 7) unlatches and draws a mark on tape 20 opposite the erroneous column (Fig. 2). As the following column goes by, magnet 228 picks up once more as follows: Line L1, switch SW, cam contact P1, point R22*c*, one of contacts R30 to R34, rectifier R, point R41*a*, magnet 228 and ground.

However, relay R2 cannot pick up as contact R2*b* remains open. If an error is detected, magnet 228 drops out once more, causing the inscription of a second mark. When the machine stops, the operator takes out the erroneous card which can be reproduced by means of conventional card punching mechanism. After correction of an error the operator depresses the start key 15 which reestablishes the various circuits already described.

*Punch suppression.*—It may be useful in some cases to eliminate the recording of certain data. For this purpose an emitter E (Fig. 9) has been provided. This emitter comprises a rotary brush B which successively contacts inserts wired to hubs H49 allowing pick-up of relay R23 connected to a hub H50. The brush B is run in synchronism with the cards and tape so that an impulse is available from the first of the hubs H49 when the first tape column runs over the reading pins in tape reading station 16. Assuming that it is desired to eliminate the data of tape columns 10 to 15, the 10th hub H49 is wired to hub H50 and the 16th hub H49 is wired to hub H52. Under these conditions the following circuit will be completed at the passage of the 10th tape column: Line L1, switch SW, brush B, 10th hub H49, hub H50, relay R23 and ground. Relay R23 when picked up transfers the twelve contacts R23*a* to R23L which break the pick-up circuits of punch magnets PM1 through PM12. At the same time a latch L51 keeps the armature of relay R23 in the attracted position. Therefore, during the reading of these columns, impulses from the tape reading contacts are ineffective to influence the punch control magnets with the result that no holes are punched in the cards during such control. It is consequently necessary, during the following cycles, that the normal verification circuits be also eliminated for that portion of the tape which has not been transcribed in order to avoid machine stoppage. To this end a relay R54 is energized by wiring between the 10th hub H49 and hub H53. Relay R54 picks up and attracts its armature which is held in its attracted position by means of a latch L55. Contact R54*a* being closed, relay R2 is held by the following circuit: Line L1, switch SW, point R54*a*, rectifier R, cam contact P3, point R2*b*, relay R2 and ground.

Normal punching and verifying operations are resumed through the following circuit: Line L1, switch SW, brush B, 16th hub H49, hub H52, relay R53 and ground. Relay R53 attracts the latch L51 which allows the restoration of the relay R23 armature. Contacts R23*a* through R23L are, therefore, restored with the result that punch magnets PM1 through PM12 once more are conditioned to function.

Similarly, wiring between hub H56 and the 16th hub H49 causes the pick-up of relay R57 in parallel with relay R53. When attracting its armature L55, relay R57 opens contact R54*a* which restores the pick-up circuit of relay R2 under the control of the verifying unit.

If it is desired to eliminate recording under tape control for a certain number of cards only, a selector relay R44 is used. A special punched hole in tape column 28 results in the pick-up of the selector relay R44 as follows: Line L1, switch SW, tape contact L*a*4, tape reading pin contact 98 (to detect the special punching in the tape), relay R8 and ground. The holding circuit is from line L1, switch SW, cam contact B*a*, relay contact HC8, holding coil R8*m* to ground.

The making of contact R8*b* directs an impulse from hub H42 to hub H43 (now plugged). The following circuit is then completed: Line L1, switch SW, cam contact P10, contact R8*b* (now closed), contacts R9*b*, R10*b*, R11*b* and R12*b*, hub H42, hub H43, relay R44 to ground. This relay is held through contact R44*a* included in the circuit from line L1, switch SW, cam contact P7, contact R44*a*, holding coil R44*m* and ground. The pick-up of relay R44 transfers contact R44*b* which, in this instance, is alone but may possibly be duplicated by similar contacts. This pick-up takes place at column B, the relay being held during a complete cycle.

If it is desirable, as previously indicated, to eliminate the recording of columns 10 to 15, but in the particular case of a group preceded by a code hole punched in column B, the 10th hub H49 is wired to hub H45 of contact R44*b*, and hub H47 is wired to hub H50. When the tape is in column 10, the following circuit is established through the brush B, line L1, switch SW, brush B, 10th hub H49, hub H45, contact R44*b* (now transferred), hub H47, hub H50, relay R23 and ground. Relay R23 transfers contacts R23*a* to R23L preventing the punching of data recorded in the tape.

It is evident that the verification circuits must be disabled during the reading of columns 10 to 15 in the tape comparison reading unit 18 at the following cycle. For this purpose contact R44*a* permits relay R59 to be energized at the end of the cycle when cam contact P8 closes. The following circuit is established: line L1, switch SW, contact P7, contact R44*a*, cam contact P8, relay R59 and ground. Contact R59*b* permits pick-up of a relay R60 which will be held during the complete following cycle as follows: Line L1, switch SW, cam contact P10, contact R59*b*, relay R60 and ground.

Closure of contact R60*a* results in the holding of relay R60 through the following circuit: Line L1, switch SW, cam contact P7, point R60*a*, relay R60 to ground. The purpose of contact R60*b* is similar to that of contact R44*b*. Contact R60*b* is wired to the hubs H61, H62 and H63.

In order to eliminate verification during the running of cards which have just been punched, columns 10 to 15 excluded, hub H61 is connected to the 10th hub H49 and hub H63 is connected to hub H53. Under these conditions when the 10th card column goes under the card reading station 14, a circuit is established as follows: Line L1, switch SW, brush B, 10th hub H49, hub H61, contact R60*b*, hubs H63 and H53, relay R54 and ground. The armature of relay R54 is kept latched by a latch L55 and contact R54*a* insures energization of stylus magnet 228 and relay R2, i. e. the holding of the clutch circuits corresponding to the card and tape feed.

The punching circuit is re-established when the brush B contacts the 16th emitter insert. Brush B causes energization of relay R53 through the following circuit: Line L1, switch SW, brush B, 16th hub H49 wired to hub H52, relay R53 to ground. When the relay R53 is energized, it causes the opening of contacts R23*a* to R23L which are restored thereby to their normal position.

At the following cycle the verification circuits are re-established as follows: Line L1, switch SW, tape contact L*a*4, 16th hub H49 wired to hub H56, relay R57 and ground. When relay R57 is energized, it attracts the latch L55 which unlatches contact R54*a*. It is, therefore, possible to eliminate the recording of certain data in predetermined data groups of the control tape.

It is evident that punch suppression could have been performed for all the cards, to the exclusion of those under control of a special punched hole in the tape. To this end it would be sufficient to connect hub H49, which corresponds to the first column, which is to be recorded, to hub H45 and to wire hub H46 to hub H50. Under these conditions only the cards corresponding to a special punched hole in the tape would be completely recorded.

The preceding circuits have been described in reference to the recording of data from tape 20 into cards from card magazine 10. Identical circuits in Fig. 10 of the drawings provide for the same control in respect to the recording of data from tape 20*a* into cards from card magazine 10*a*.

If the data recorded in tape 20*a* only is to be reproduced on cards from card magazine 10*a*, switch T*b* is closed so that its contacts T*b*1 to T*b*6 serve the same purpose as contacts T*a*1 to T*a*6. A signal light 230 (Fig. 8) warns that an error is being detected during the verification of the data punched in the cards of said hopper 10*a*. This lamp also is illuminated whenever the working conditions of the machine, as respects recording from tape 20*a*, are not satisfactory.

The object of relays R19, R68 and R69 is respectively the same as that of relays R18, R17 and R22. Similarly relay R29 has the same purpose as relay R13. Punching magnets PM1*a* through PM12*a* are shown in Fig. 10 of the drawings and so is relay R28 whose contacts R28*c* close the starting circuit of the machine by energization of relay R20. This contact is similar to contact R2*c*. Finally, selector relays R105 and R106 shown in Fig. 10 are used to suppress punching and verification of predetermined data in manner similar to that described in respect to the corresponding relays in Fig. 9 of the drawings.

Two tape controlled contacts L*b*4 and L*b*5 (Fig. 10) are closed as soon as the tape 20*a* is inserted in the reading heads 16*a* and 18*a*. Cam contacts P*b*3 and P*b*8 are closed at the same time as corresponding cam contacts P3 and P8. The circuits shown in Fig. 10 will not be described as they are identical in function to those shown in Fig. 9 and arranged in generally the same order for ready identification.

Pins 98*a* (Fig. 10) are the tape reading pins in tape reading unit 16*a* and pins 98*a*' are the reading pins of reading unit 18*a*.

When relay coils R110, R111, R112 and R113 are required, hubs H114, H115, H116 and H117 are wired to hubs H49 (Fig. 9) and to the hubs of contacts R105*b* and R106*b*.

If it is desired to simultaneously record data from tape 20 and 20*a* into cards from card magazines 10 and 10*a*, respectively, switches T*a* and T*b* are both closed. It should be observed that the starting circuits of the machines are now controlled by contacts of relays R17, R18, R19, R22, R68 and R69, and that the pick-up of card clutch control magnet CCR can only take place when the tapes are so positioned that their first columns corespond to the first columns of their respective cards.

*Gang punching circuits.*—Assuming that it is desired to punch into a series of cards some particular information recorded in the first card, and assuming further that cards from the magazine 10 are to be punched, the operator closes switch P*a* which controls contacts P*a*1, P*a*2 and P*a*3. Should it be desired to process cards in this manner from the card magazine 10*a*, switch P*b* and its contacts P*b*1, P*b*2 and P*b*3 would be closed. However, proceeding on the original assumption, when the start key 15 is closed, the following circuit is completed: Line L1, switch SW, tape tension contacts 32 and 32*a*, card pocket lever contacts L*a*6 and L*b*6, contacts L*b*5, L*a*5, stop key SK, start key contact 15*a*, contact D4, point R18*a*, point R17*b*, point R22*a*, point R19*a*, point R13*d*, point R29*d* and relay R20. Relay R20 is held through cam contact C1 and point R20*b*. Closure of cam contact C1 results in the energization of card clutch control magnet CCR, as previously explained.

During this cycle relay R17 picks up and completes the following additional holding circuit: from Line L1, switch SW, tape tension contacts 32 and 32*a*, card pocket lever contacts L*a*6 and L*b*6, contacts T*b*5 and T*a*5, stop key contact SK, start key contact 15*a*, contact D4, point R18*a*, point R17*b*, point R19*a*, point R13*d*, point R29*d* and relay R20. The machine thus feeds a new card at each cycle.

The pins of the card reading station 14 permit closure of contacts 14*a*–14L corresponding to the reading of the card data by pins in station 14.

As relay R22 is energized, the following circuit will be completed: Line L1, switch SW, cam contact P1, contact R22*c*, one of the contacts 14*a*–14L which happens to be closed, one of the hubs H65*a*–H65L wired for this purpose, to corresponding hubs H64*a*–H64L, one of the contacts R23*a*–R23L corresponding to the punch magnet of the group PM1–PM12 to be energized. This circuit is completed only if relay R23 is permanently energized as previously described.

It is possible for example to wire the first hub H49 (Fig. 9) to hub H50. If it is desired to eliminate the last card punching, hub H50 would be wired to the last hub H49 indicated in Fig. 9 by the reference character C.

It may develop that gang punching is to be used for a certain group of cards only, each being preceded by a master card characterized by a special control hole punched therein. This special control hole is sensed by the reading brush 174 which renders available an impulse at plug hub H67. If the hub H67 is connected to the selector relay R44, the following circuit is completed: Line L1, switch SW, cam contact P1, point R17*b*, pin contact 174, hub H67, hub H43, relay R44 and ground. This relay is held as previously explained by contact R44*a* and cam contact P7. Therefore, when a master card is run under the reading brushes, contact R44*b* is transferred.

In this punching operation, certain data from a preceding card may be eliminated by suppressing the action of the punch magnets. For instance, if data recorded in columns 10 to 15 is to be eliminated from trailing cards, 10th hub H49 is wired to hub H45 and H46 is wired to hub H50. Under these conditions it is evident that no circuit will be available to pick up relay R23 since the impulse from hub H49 is directed through contact R44*b* now transferred, to hub H47 which is not wired. Therefore, the impulses received at hubs H65*a* through H65L cannot pick up any of the punch magnets PM1 through PM12. On the contrary, during the following cycle the data of the master card is sensed by pins 14 and directed to the following card through the pick-up of relay R23 as per the following circuit: Line L1, switch SW, brush B, 10th hub H49, hub H45, contact R44*b*, hub H46, hub H50 and relay H23 to ground.

Gang punching operations as herein described may be combined with recording operations as previously described. Under such conditions the tape recording control switch T*a* and its points T*a*1 through T*a*6 will be closed, and connections such as those just described must be provided. These connections are necessary if, for example, the tape is composed of groups bearing permanent data to be recorded in a set of cards, and the corresponding field or columns of following tape groups have been left blank.

Assuming that the first tape group has recorded therein permanent data in columns 10 to 15, and that a certain number of groups immediately following the first has no data punched in corresponding columns, under these conditions the data of the first group is recorded on the first card as already explained. When the second group is reached, detection of the control hole, which in this instance has been provided in row 1, column B, allows the pick-up of the selector relay R44 through the wiring from hubs H42 and H43. Upon reading of this control hole the following circuit is established: from line L1, through switch SW, tape contact L*a*4, reading pin contact 98, relay R8 to ground. The closure of contact R8*b* causes the pick-up of relay R44 as follows: Line L1, switch SW, cam contact P10, point R8*b* (now closed), points R9*b* through R12*b* (normally closed), hubs H42 and H43, relay R44 and ground. The relay is held through circuits previously described.

The recording of data contained in the first nine columns of the first tape group is accomplished as previously described. However, the punching of the permanent data is performed through the reading of the preceding card over card reading pins 14. For this purpose the 10th hub H49 is wired to hub H45, and hub H47 is wired to hub H50. The pick-up circuits of the punch magnets are then controlled by hubs H64*a* through H64L which, connected to hub H65, receive impulses of the reading pins of station 14. When the 15th column is punched under control of the corresponding column in the preceding card, relay R53 picks up as follows: Line L1, switch SW, brush B, the 16th hub H49, hub H52, relay R53 and ground. This relay restores the armature of relay R23, whose contacts re-establish the normal pick-up circuits of the punch magnets. These operations are repeated until a group is sensed in which no control code is found in column B. In this case the recording is performed in normal fashion as previously described without any gang punching operation. Several such groups, i. e. normal transcription groups, may be transcribed successively until a control hole punched in column B is detected. Upon detection of a further control hole in a succeeding B column, the new permanent data in the control tape is punched into the card and subsequent cards are gang punched.

The pick-up circuits to hub H42 may be duplicated by another set of circuits devised for the detection of other codes. Particularly, a special relay may be provided for the detection of master cards, this relay being controlled from hub H67, while a set of relays R44 designed to detect special punchings in the tape may be wired to various of the hubs H42.

While the foregoing punching operation has been described as under control of reading stations 14 and 16, it is applicable to the corresponding circuits under control of reading stations 14*a* and 16*a*.

Furthermore, gang punching may be performed simultaneously on cards from feed hoppers 10 and 10*a*. In this case not only switch P*a* and its contacts P*a*1, P*a*2 and P*a*3 are closed, but also switch P*b* and its contacts P*b*1, P*b*2 and P*b*3 are closed.

Instead of leaving blank the field following the permanent data field as indicated in the preceding example, variable data may be recorded following such fields. If, for example, we assume that the permanent data in the first field is punched in columns 10 to 15, the following data field will accommodate only 19 columns instead of 25. An important time advantage is thus achieved in the recording of the data. To secure such result the operator must wire hub H42 to hub H43 so that each time a control hole in column B is detected, relay R44 can be picked up. Such hole is systematically punched before each field comprising a number of columns less than 25 in the example selected.

When the first tape field is run through the reading station 16, the recording of data on the first card is achieved as already explained. Recording in the card is achieved in like manner when the first nine columns of the tape of the succeeding field are run through the reading head 16. At the 10th column the following circuit is completed: Line L1, switch SW, brush B, 10th hub H49, hubs H45, H47 (Fig. 9), H140, relay R141 (Fig. 8) and ground. The armature of relay R141 is attracted and remains latched by latch L143. Contact R141*a* breaks and deenergizes the tape reader magnets 106 and 106'. The tape, therefore, stops at the 10th column. At the same time a second circuit is made to pick up relay R23 through the wiring between hubs H47 and H50. The pick-up of relays R23 causes the transfer of contacts R23*a* through R23L, which places the pick-up circuits of punch magnets PM1 through PM12 under control of hubs H64*a* through H64L. These are wired to corresponding hubs H65*a* through H65L to receive the impulses generated at card reading station 14.

The permanent data read from the first card controls the gang punching thereof on the following card. When the 15th column is punched and the 16th hub H49 is wired to hub H52, relay R53 will be energized, attracting its armature and restoring contacts R23*a* through R23L. These contacts thereby re-establish the normal pick-up circuits of the punch magnets PM1 through PM12.

In parallel with the pick-up circuit of relay R53, a circuit is completed from the 16th hub H49 wired to hub H149. This wiring causes the pick-up of relay R142 which, attracting its armature R143, restores contact R141*a*, the latter re-establishing the pick-up circuit of reader magnets 106 and 106'. This causes tape feeding to be resumed, and the recording operations to proceed normally. This operation is repeated for each group of 19 columns.

As soon as a 25 column group appears and no control hole is detected in column B, relay R44 does not pick up and no impulse is available from hub H47. Therefore, relays R23 and R141 cannot pick up. The tape feeding is continuous and results in the normal transcription of data from the tape to the card.

Verification may be eliminated as may be required during the foregoing operation by wiring from the first hub H49 to hub H53. At each cycle the normal circuits may be re-established by wiring hub C, i. e. the last hub H49 to hub H56. Several 25 column data groups may be consecutive without the necessity of changing the above described circuits. As soon as a new 19 column group occurs, the detection of a control hole punched in column B completes the control circuits of the tape feed which have been described. It is, therefore, possible to record on different cards, data pertaining to groups comprising a reduced number of columns.

*Reproducing circuits.*—It may be desirable to reproduce some data from one card deck into another card deck, i. e. from punched cards, for example, in one card magazine into blank cards in the second card magazine. For this purpose the reproducing switch D and its contacts D1 through D5 must be closed. Contacts D4 and D5 are designed to break the pick-up circuits of relays R13 to R29, as well as the circuit of signal lamps 226 and 230 used in recording operations.

Before the machine is started for reproducing operations, the cards to be reproduced are placed in card magazine 10, which causes closure of card magazine lever contact L*a*1 and pick-up of relay R18. The operator then depresses start key 15 which results in the pick-up of the card clutch control magnet CCR through the following circuit: Line L1, switch SW, tape tension contacts 32 and 32*a*, card pocket levers L*a*6 and L*b*6, contacts T*b*5 and T*a*5, stop key contact SK, start key contact 15*a*, contact D4, points R18*b*, R17*c*, R19*b*, R13*d*, R29*d* and relay R20. Relay R20 is held by its contact R20*b* and cam contact C1. Similarly, relay CCR picks up through its contact R20*c* and cam contact C2 as previously described. A feed cycle takes place during which relay R17 picks up through the making of punch block card lever contact L*a*2 . At the end of this cycle the machine automatically stops even if the start key is maintained closed. The operator must then place the second deck of cards into hopper 10*a* which causes the pick-up of relay R19 through the following circuit: Line L1, switch SW, card lever contact L*b*1, relay R19 and ground.

When the operator once more closes the start key the pick-up circuit of the card clutch control magnet CCR is completed as follows: Line L1, switch SW, tape tension contacts 32 and 32*a*, card pocket lever contacts L*a*6 and L*b*6, contacts T*b*5 and T*a*5, stop key contact SK, start key contact 15*a*, contact D4, points R18*b*, R17*c*, R19*b* (now transferred), R13*d*, R29*d* and relay R20 to ground. During this cycle relay R22 picks up as well as relay R69.

The operator must keep the start key depressed so that relay R20 may be held through the pick-up of relay R68 which takes place when the first card from the hopper 10 runs under the reading station 14. Relay R20 is then held as follows: Line L1, switch SW, tape tension contacts 32 and 32*a*, card pocket lever contacts L*a*6 and L*b*6, contacts T*b*5 and T*a*5, stop key contact SK, contact D3, points R18*c*, R17*d*, R22*b*, contact D2, points R68*b*, R69*c*, R19*c*, R13*c*, R29*d*, R20*a*, relay R20 to ground. The card clutch control magnet CCR is thus kept energized and the feeding of cards from hoppers 10 and 10*a* is performed with a relative delay of one card between strokes of the picker units 166 and 166*a*.

The data analyzed in the first card from hopper 10 is punched automatically into the first card from hopper 10*a* which is running under punching station 12*a*. This is accomplished through wiring between the hubs H65*a* through H65L and hubs H37*a* through H37L as shown in Fig. 10.

Figure 1:
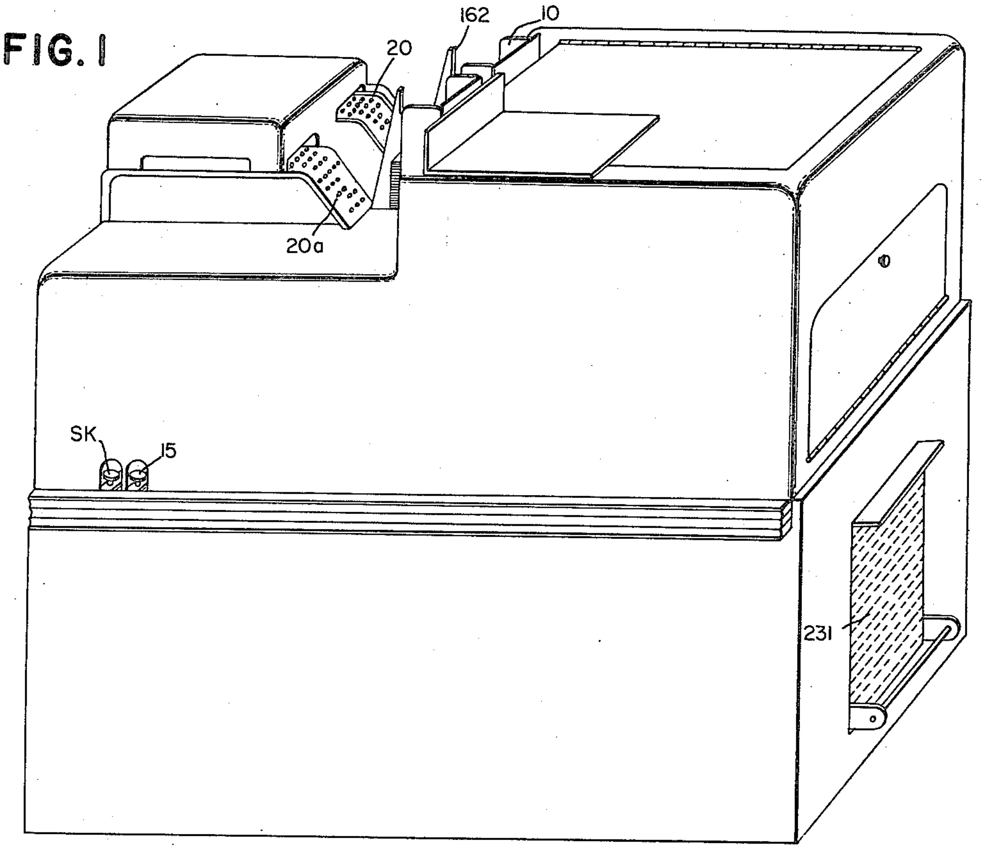
Fig. 1 is a perspective view of the tape controlled record card punching mechanism herein.

In order that punch magnets may be controlled, it is necessary, as in gang punching operations, to pick up relay R110, whose function is the same as that of relay R23. For this purpose hub H115 is wired to 1st hub H49 and hub H114 to the last hub H49. The following circuits are thus completed: Line L1, switch SW, brush B, 1st hub H49, hub H115, relay R110 and ground. The pick-up of relay R110 causes contacts R110*a* to R110L to make, thereby completing a circuit from line L1 through switch SW, cam contact P1, contacts R22*c*, one of contacts R35*a* through R35L, corresponding one of hubs H65*a* through H65L, corresponding hubs H37*a* through H37L, corresponding contact of contacts R110*a* through R110L, and associated punch magnet of the group PM1*a* through PM12*a*. Therefore the data is read from a card in hopper 10 and punched into a card from hopper 10*a* by means of the punching unit 12*a*. It is evident that the reverse operation may be achieved through the use of card reading pins 14*a* to punch data into cards from card magazine 10 under punch unit 12. The various plug connections are facilitated by the use of a plug-board 231 (Fig. 1).

Although the essential features of the present invention that are described herein and illustrated in the accompanying drawings are shown in a specific embodiment, it is obvious that various modifications may be made in the details of the machine and the functions thereof without altering the spirit of the invention.

What is claimed is:

1. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, a card feeding mechanism including a plurality of card feeding rollers associated with said punching station for feeding blank record cards under said punch elements in said station in column by column order, means for synchronously driving said rollers intermittently to advance a continuous succession of record cards under said punch elements a column at a time, a control tape reading station, means for advancing a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing a control perforation in a control tape in said control tape reading station, means for sensing perforations in a record card after the same has passed said punching station and means responsive to said control perforation sensing means for transferring control of said punch elements from said control tape to said card sensing means.

2. In a machine for perforating record cards in column by column order under control of a record tape, a card punching station having a plurality of card punching elements therein, a plurality of card feeding rollers associated with said punching station for feeding blank record cards under said punch elements in said station in column by column order, means for synchronously driving said rollers intermittently to advance a continuous succession of record cards under said punch elements a column at a time, a control tape reading station, means for advancing a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing perforations in a record card after the same has passed said punching station, means responsive to a signal from said tape reading station to render said punch elements responsive to said record card reading means whereby certain data punched into a record card under control of said tape reading station is reproduced in a following card by said punch elements, and means responsive to a tape reading station signal to render said punch elements responsive to signals from said tape reading station to punch tape carried data into such following card.

3. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, a plurality of card feeding rollers associated with said punching station for feeding blank record cards under said punch elements in said station in column by column order, means for synchronously driving said rollers intermittently to advance a continuous succession of record cards under said punch elements a column at a time, a control tape reading station, a constantly rotating cam shaft, means operable by said cam shaft for advancing a control tape through said tape reading station, electromagnetic means for rendering said cam shaft effective to operate said tape advancing means effective to advance a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, and means for energizing said electromagnetic means.

4. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, card feeding mechanism including a plurality of card feeding rollers associated with said punching station for feeding blank record cards under said punch elements in said station in column by column order, means for synchronously driving said rollers intermittently to advance a continuous succession of record cards under said punch elements a column at a time, a control tape reading station, a constantly rotating cam shaft, means operable by said cam shaft for advancing a control tape through said tape reading station, electromagnetic means for rendering said cam shaft effective to operate said tape advancing means effective to advance a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for emitting a signal at each feeding step of said card feeding mechanism and means under control of said signal emitting means effective to control said electromagnetic means.

5. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, card feeding mechanism including a plurality of card feeding rollers associated with said punching station for feeding blank record cards under said punch elements in said station in column by column order, means for synchronously driving said rollers intermittently to advance a continuous succession of record cards under said punch elements a column at a time, a control tape reading station, a constantly rotating cam shaft, means operable by said cam shaft for advancing a control tape through said tape reading station, electromagnetic means for rendering said cam shaft effective to operate said tape advancing means effective to advance a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing a control perforation in a control tape in said control tape reading station, means for sensing perforations in a record card after the same has passed said punching station, means under control of said control perforation sensing means for transferring control of said punch elements from said control tape to said card sensing means, and means selectively responsive to operation of said card feeding mechanism to deenergize said electromagnetic means during punch control by said card sensing means and to reenergize the same when said control is terminated.

6. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, a card feed mechanism including a plurality of card feeding rollers associated with said punching station for feeding blank record cards under said punch elements in said station in column-by-column order, means for synchronously driving said rollers intermittently to advance a continuous succession of record cards under said punch elements a column at a time, a control tape reading station, means for advancing a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing a control perforation in a control tape in said control tape reading station, means for sensing perforations in a record card after the same has passed said punching station, means responsive to said control perforation sensing means for transferring control of said punch elements from said control tape to said card sensing means, and means operative to disable said tape advancing means when said punch elements are under control of perforations in a card in said card sensing means.

7. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, a card feed mechanism including a plurality of card feeding rollers associated with said punching station for feeding blank record cards under said punch elements in said station in column-by-column order, means for synchronously driving said rollers intermittently to advance a continuous succession of record cards under said punch elements a column at a time, a control tape reading station, means for advancing a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing a control perforation in a control tape in said control tape reading station, means for sensing perforations in a record card after the same has passed said punching station, means responsive to said control perforation sensing means for transferring control of said punch elements from said control tape to said card sensing means, and means responsive to operation of said card feed mechanism for disabling said tape advancing means when said punch elements are under control of perforations in a card in said card sensing means.

8. In a machine for perforating rectangular record cards adapted to receive record data items in parallel columns across the shorter axis thereof and in which each column has a plurality of index points under control of a record tape having data representing code perforations disposed transversely thereof, a card punching station having a plurality of card punching elements therein corresponding in number to the number of index points in a card column, a card feed mechanism including a plurality of card feeding rollers associated with said punching station for feeding blank record cards under said punch elements in said station in column-by-column order, means for synchronously driving said rollers intermittently to advance a continuous succession of record cards under said punch elements a column at a time, a control tape reading station, means for advancing a control tape through said tape reading station in synchronism with the passage of record cards through said punching station, means in said tape reading station under control of a tape therein for producing a punch control signal, means directly responsive to signals produced in said tape reading station for controlling the operation of the punch elements in said punching station, means for sensing a control perforation in a control tape in said control tape reading station, means for sensing perforations in a record card after the same has passed said punching station, means responsive to said control perforation sensing means for transferring control of said punch elements from said control tape to said card sensing means, and means for rendering said punch elements unresponsive to selected columns of tape data.

References Cited in the file of this patent

UNITED STATES PATENTS

| | | |
|---|---|---|
| Re. 21,133 | Lake | June 27, 1939 |
| 2,032,805 | Lake | Mar. 3, 1936 |
| 2,053,067 | Cunningham | Sept. 1, 1936 |
| 2,183,820 | Nelson | Dec. 19, 1939 |
| 2,224,764 | Dickinson | Dec. 10, 1940 |
| 2,263,291 | Dowey | Nov. 18, 1941 |
| 2,340,801 | Doty | Feb. 1, 1944 |
| 2,547,456 | Gardinor | Apr. 3, 1951 |
| 2,550,909 | Busch | May 1, 1951 |
| 2,558,476 | Carpenter | June 26, 1951 |
| 2,581,184 | Goff | Jan. 1, 1952 |
| 2,595,889 | Ryffel | May 6, 1952 |